United States Patent
Anastas (10) Patent No.: US 10,334,381 B2
(45) Date of Patent: Jun. 25, 2019

(54) BINAURAL AUDIO SYSTEMS AND METHODS

(71) Applicant: Chris T. Anastas, Phoenix, AZ (US)

(72) Inventor: Chris T. Anastas, Phoenix, AZ (US)

(73) Assignee: SOUNDFI SYSTEMS, LLC, Sherman Oaks, CA (US)

( * ) Notice: Subject to any disclaimer, the term of this patent is extended or adjusted under 35 U.S.C. 154(b) by 0 days.

(21) Appl. No.: 15/291,589

(22) Filed: Oct. 12, 2016

(65) Prior Publication Data

US 2017/0034638 A1    Feb. 2, 2017

Related U.S. Application Data

(63) Continuation of application No. 14/686,445, filed on Apr. 14, 2015, now Pat. No. 10,178,487.

(Continued)

(51) Int. Cl.
| | | |
|---|---|---|
| H04S 1/00 | (2006.01) |
| H04R 1/10 | (2006.01) |
| H04R 5/033 | (2006.01) |
| G10L 19/018 | (2013.01) |

(Continued)

(52) U.S. Cl.
CPC ........... H04S 1/007 (2013.01); G10L 19/018 (2013.01); H04R 1/1041 (2013.01); H04R 5/033 (2013.01);
(Continued)

(58) Field of Classification Search
CPC ... H04S 1/007; H04S 2400/01; G10L 19/018; H04R 1/1091; H04R 2499/11;
(Continued)

(56) References Cited

U.S. PATENT DOCUMENTS

| | | |
|---|---|---|
| 7,881,713 B2 | 2/2011 | Hale et al. |
| 7,995,770 B1 | 8/2011 | Simon |

(Continued)

FOREIGN PATENT DOCUMENTS

| | | |
|---|---|---|
| WO | 2012/114169 A1 | 8/2012 |
| WO | 2015/160804 A1 | 10/2015 |

OTHER PUBLICATIONS

Receiving Office of the U.S. Patent and Trademark Office; PCT International Search Report, Issued in Connection to PCT/US15/25745; 4 pages; dated Sep. 15, 2015; US.

(Continued)

*Primary Examiner* — Vivian C Chin
*Assistant Examiner* — Con P Tran
(74) *Attorney, Agent, or Firm* — Greenberg Traurig LLP (57) ABSTRACT

Some embodiments include a system for delivery of binaural audio to a consumer including a computing device with a processor, a non-transitory computer readable medium having stored instructions that when executed by the computing device, cause the computing device to perform operations for delivery of the binaural audio to the consumer through the consumer device. The operations can enable a delivery server to associate the consumer device with a binaural audio file associated with the event attended by the consumer. The operations can enable the consumer device to retrieve and download a binaural audio file from the delivery server, and to receive synchronization information associated with the event and the binaural audio file. The operations can also include processing the binaural audio file and delivering audio through an audio emitting device coupled to the consumer device, where the delivered audio is synchronized with the event.

27 Claims, 6 Drawing Sheets

Related U.S. Application Data (60) Provisional application No. 62/102,390, filed on Jan. 12, 2015, provisional application No. 61/979,930, filed on Apr. 15, 2014.

(51) Int. Cl.
*H04R 5/04* (2006.01)

(52) U.S. Cl.
CPC .............. *H04R 1/1075* (2013.01); *H04R 5/04* (2013.01); *H04S 2400/15* (2013.01)

(58) Field of Classification Search
CPC ........ H04R 1/1041; H04R 5/033; H04R 5/04; H04R 1/1075
USPC ........ 381/2, 1, 77, 309, 300, 17, 26, 80, 74, 381/370, 182; 348/14.02, 211.3, E5.008, 348/485, 484, 483, 482, 476; 709/203, 709/219, 218, 217; 725/4, 82, 91, 103; 715/744, 733; 352/12, 1; 455/151.2, 455/41.2, 41.3, 464
See application file for complete search history.

(56) References Cited

U.S. PATENT DOCUMENTS

| | | |
|---|---|---|
| 8,495,236 B1 | 7/2013 | Glasser |
| 8,515,103 B2 | 8/2013 | Mei et al. |
| 8,634,030 B2 | 1/2014 | Hale et al. |
| 2006/0045294 A1 | 3/2006 | Smyth |
| 2010/0104118 A1 | 4/2010 | Sasidharan et al. |
| 2010/0223062 A1 | 9/2010 | Srinivasan et al. |
| 2010/0302393 A1 | 12/2010 | Olsson et al. |
| 2010/0322340 A1 | 12/2010 | Bohm |
| 2012/0095749 A1 | 4/2012 | Capretta |
| 2012/0308067 A1 | 12/2012 | Ip |
| 2013/0272672 A1 | 10/2013 | Rondon et al. |
| 2013/0301392 A1 | 11/2013 | Zhao |
| 2014/0028914 A1 | 1/2014 | Polak et al. |
| 2014/0079241 A1 | 3/2014 | Chan et al. |
| 2014/0297815 A1 | 10/2014 | Rajapakse |
| 2015/0296288 A1 | 10/2015 | Anastas |

OTHER PUBLICATIONS

Receiving Office of the U.S. Patent and Trademark Office; PCT Written Opinion of the International Searching Authority, Issued in Connection to PCT/US15/25745; 6 pages; dated Sep. 15, 2015; US.

BINAURAL AUDIO SYSTEMS AND METHODS

RELATED APPLICATIONS

This application is a continuation-in-part of U.S. patent application Ser. No. 14/686,445 filed on Apr. 14, 2015, which claims priority under 35 U.S.C. § 119 to U.S. Provisional Application Ser. No. 62/102,390 entitled "BINAURAL AUDIO SYSTEMS AND METHODS", filed Jan. 12, 2015, and to U.S. Provisional Patent Application Ser. No. 61/979,930 entitled "BINAURAL SOUND CAPTURE AND MULTI-USER SYNCHRONIZED REPLAY", filed Apr. 15, 2014. The entire contents of each of the foregoing applications are incorporated herein by reference.

TECHNICAL FIELD

The invention generally relates to audio recording and playback, and more particularly to systems and methods for capturing and presenting synchronized audio, for example binaural audio.

BACKGROUND

Conventional audio capture and reproduction approaches have remained, at the core, largely unchanged for an extended period of time. Audio data is captured via one or more microphones, stored on or in a recording medium, and then played back via one or more loudspeakers. While such systems and related technologies have become increasingly ubiquitous, powerful, compact, and energy-efficient, they have generally not allowed for simultaneous mass customization of audio, nor have they allowed for expanded approaches for interaction with an audience.

Theater-style surround sound systems offer only limited sound staging/sound localization capabilities due to incomplete sound isolation. For example, sound emanating from a loudspeaker on the left side of the theater will eventually reach both the left ear and the right ear of a moviegoer, with the sound arriving at the right ear after a slight delay as compared to the left ear. Binaural sound that is delivered via headphones offer significantly improved sound staging/sound localization potential, but has proven difficult and/or impractical to implement. Accordingly, the audio portion of many audiovisual (A/V) entertainment forms remains subject to significant improvement, where systems for obtaining, delivering, and synchronizing binaural audio remain desirable. The benefits provided by the functionality of such a system can include, for example, increased consumer immersion and interactivity with media, increased customer goodwill, decreased media development expenses, increased language localization capabilities in connection with media presentation, and the like. For example, a moviegoer can benefit from receiving audio presented in a more realistic manner and/or in a language preferred by the moviegoer. On the other hand, movie-industry organizations benefit from reduced expenses associated with recording and mixing of audio data associated with a movie, the ability to charge a premium price for an upgraded audio experience, the ability to more effectively target audience advertising, and so forth.

SUMMARY

Some embodiments include a system for delivery of binaural audio to a consumer comprising a computing device comprising at least one processor, and a non-transitory computer readable medium, having stored thereon, instructions that when executed by the computing device, cause the computing device to perform operations for delivery of the binaural audio to the consumer through and within at least one consumer device. The operations can enable a delivery server to associate the at least one consumer device with at least one binaural audio file associated with at least a portion of an event attended by the consumer. The operations can enable the at least one consumer device to retrieve and download at least a portion of the at least one binaural audio file from the delivery server. Further, the operations can enable receiving, at the at least one consumer device, synchronization information associated with at least a portion of the event and the at least one binaural audio file. The operations can also include processing the at least one binaural audio file and delivering audio through an audio emitting device coupled to the at least one consumer device, where the delivered audio is synchronized with at least a portion of the event.

In some embodiments, at least some of the operations cause the delivery server to access or record at least a portion of a live or previously recorded audio file associated with the event. In some embodiments, at least some of the operations cause the delivery server to process or convert at least a portion of the audio file to the at least one binaural audio file. In some further embodiments, the at least one binaural audio file is delivered to the at least one consumer device prior to the event. In some other embodiments, at least a portion of the at least one binaural audio file is delivered to the at least one consumer device during the event.

In some embodiments, the synchronization is accomplished via an audio sync signal emitted from loudspeakers in a venue for the event. In some further embodiments, the audio sync signal encodes a series of tones representing an audio offset value, the series of tones comprising different frequencies representing consecutive identical digits in the audio offset value. Some embodiments further comprise re-synchronizing of the delivered audio while the event is in progress. In some further embodiments, the synchronization information comprises audio information having a frequency between about 17 KHz and 18 kHz. In the some embodiments, the synchronization information comprises audio information having a frequency of 17.9 kHz.

In some embodiments, the event is a motion picture. In some further embodiments, the operations cause the at least one consumer device to download an audio track for the motion picture, the audio track encoded with binaural audio information. In some embodiments, the at least one consumer device comprises a mobile computing device.

In some embodiments of the invention, the synchronization information is received by at least one microphone of the at least one consumer device or associated device associated or coupled to the at least one consumer device.

Some embodiments include a system for delivery of binaural audio to consumer where the operations comprise causing a delivery server to access or record at least a portion of a live or previously recorded audio file associated with an event, and processing or converting at least a portion of the audio file to least one binaural audio file. Further, the operations enable a delivery server to associate the at least one consumer device with the at least one binaural audio file associated with at least a portion of the event, and enable the at least one consumer device to retrieve and download at least a portion of the at least one binaural audio file from the delivery server. Further, during the event, the operations can receive at the at least one consumer device, at least one audio sync signal associated with at least a portion of the event and the at least one binaural audio file, and process the at least one binaural audio file and delivering audio through an audio emitting device coupled to the at least one consumer device, where the delivered audio is synchronized with at least a portion of the event.

In some embodiments, at least a portion of the at least one binaural audio file is delivered to the at least one consumer device during the event. In some further embodiments, the at least one binaural audio file is delivered to the at least one consumer device prior to the event. In some further embodiments, the audio sync signal emitted from loudspeakers of the event. In some embodiments of the invention, the audio sync signal encodes a series of tones representing an audio offset value, the series of tones comprising different frequencies representing consecutive identical digits in the audio offset value. Further, some embodiments further comprise re-synchronizing of the delivered audio while the event is in progress. Further, in some embodiments, the audio sync signal is received by at least one microphone of the at least one consumer device or associated device associated or coupled to the at least one consumer device The contents of this summary section are provided only as a simplified introduction to the disclosure, and are not intended to be used to limit the scope of the appended claims.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives that fall within the scope of embodiments of the invention.

For the sake of brevity, conventional techniques for audio recording, processing, playback, synchronization, and/or the like may not be described in detail herein. Furthermore, the connecting lines shown in various figures contained herein are intended to represent functional relationships and/or physical, electrical, communicative, or logical couplings between various elements. It should be noted that many alternative or additional components, relationships, or connections can be present in a practical binaural audio system.

Some or all of the shortcomings of prior approaches can be overcome by utilizing the systems and methods of the various embodiments disclosed herein. For example, by utilizing headphones in connection with audio data (for example, binaural audio data) delivered via a mobile device (for example, a smartphone), a moviegoer can experience a movie with lifelike or near-lifelike sound localization; stated another way, embodiments of the invention facilitate creation and delivery of realistic three-dimensional audio, for example in a theater. Additionally, some embodiments of the invention facilitate increased audience and/or customer interaction with media-based entertainment, such as movies, television programs, and/or the like. In some embodiments, embodiments of the invention contemplate a movie-going experience in "6-D" (three-dimensional video plus three-dimensional audio), allowing previously unobtainable levels of immersion and consumer engagement.

In some embodiments of the invention, binaural audio systems and methods described herein can partially or fully reshape the way consumers interact with entertainment, for example via movie theater attendance, or via viewing of live and/or prerecorded content on television, computer, mobile device, and/or the like. As used herein, a "binaural audio system" can be any system configured to facilitate recording, processing, delivery, and/or synchronized playback of audio data, and particularly binaural audio data; stated another way, principles of the invention contemplate improved capabilities for sound staging, localization, and immersivity, including via customization and/or synchronization.

In various embodiments of the invention described herein, binaural audio systems, and methods embodied and/or performed at least partially by the systems, can include, but are not limited to, at least one user interface ("UI"), one or more software modules, one or more logic engines, one or more databases, interfaces to external systems and tools, network communications capabilities, and combinations thereof.

While some embodiments of binaural audio systems can contemplate upgrades or reconfigurations of existing software and/or electronic devices (for example, smartphones), changes to existing databases and system tools are not necessarily required by principles of the invention.

Figure 1A:
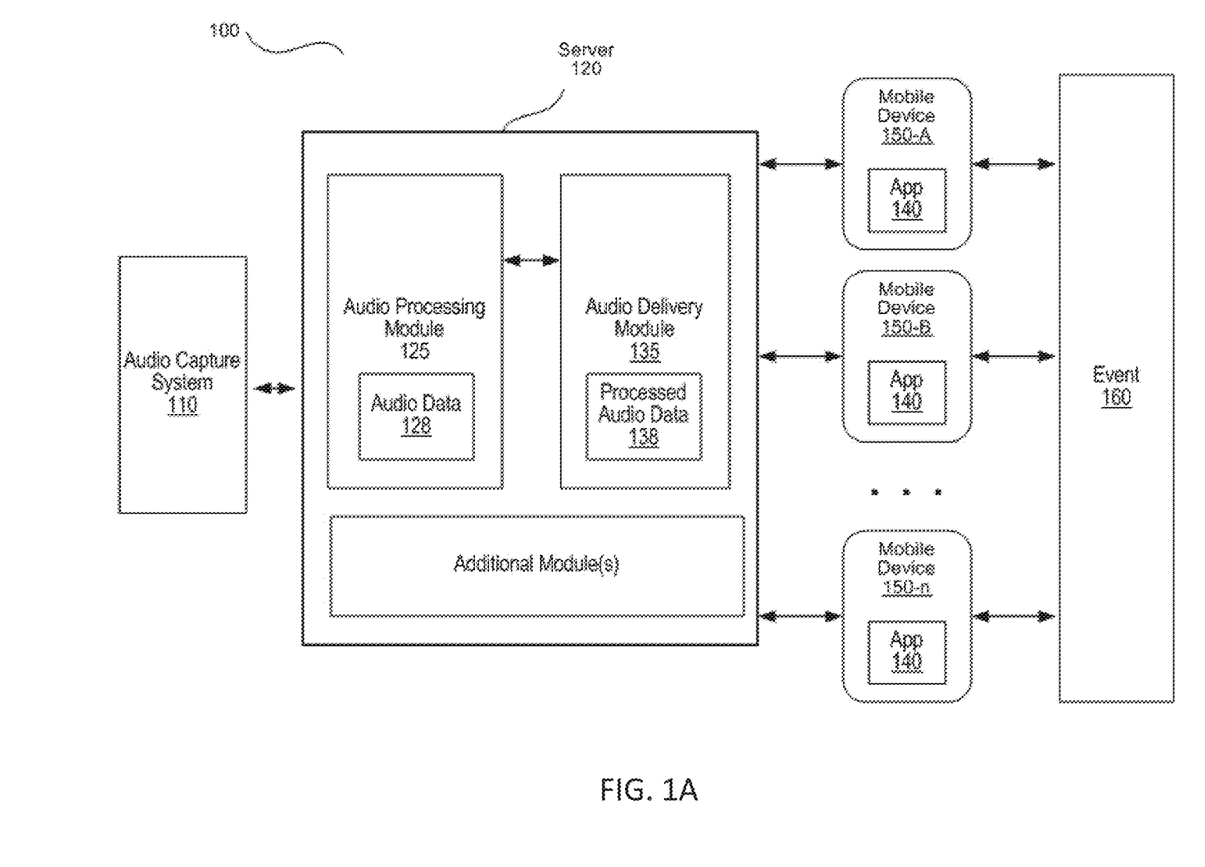
FIG. 1A is a block diagram illustrating components of a binaural audio system, together with related components in accordance with various embodiments of the invention.
Figure 1B:
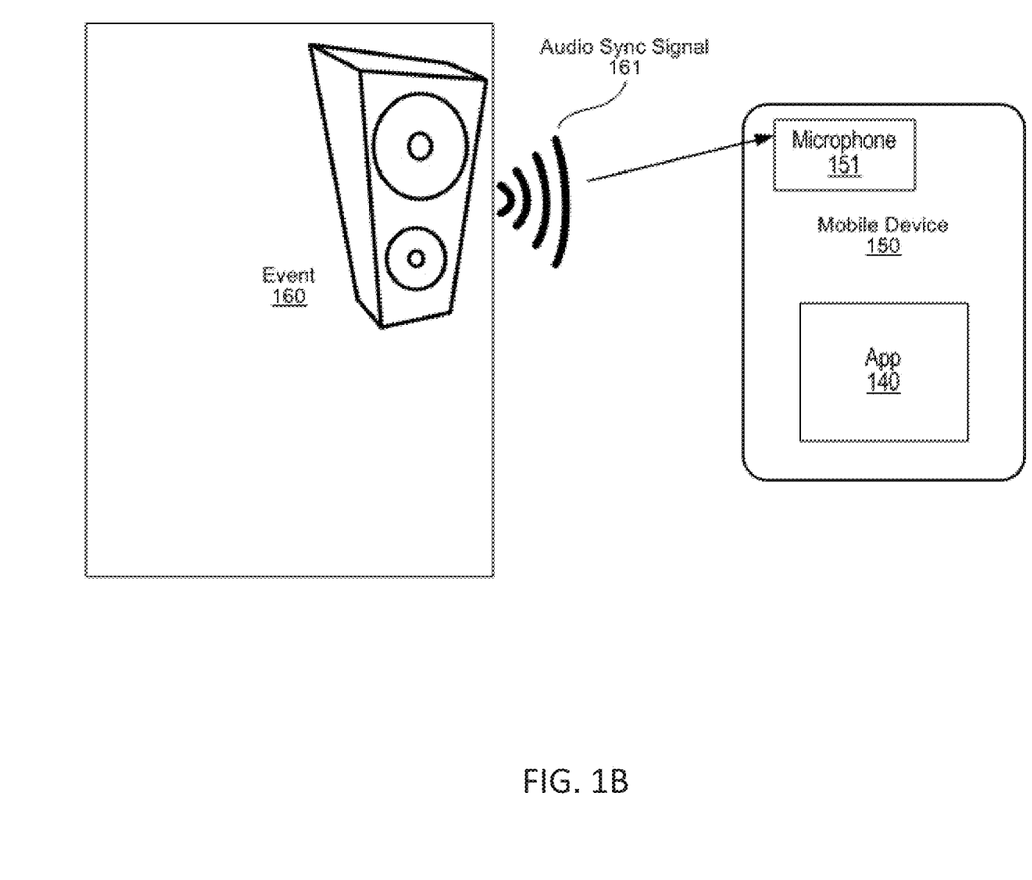
FIG. 1B illustrates synchronization of binaural audio playback with an event in accordance with various embodiments of the invention.

With reference now to FIGS. 1A and 1B, some embodiments include a binaural audio system and method 100 comprising a server 120 configured to couple to at least one user's device, such as at least one mobile device 150 including at least one mobile application or "app" (shown as app 140). In the various embodiments described herein, components, modules, and/or engines of binaural audio system and method 100 can be implemented as or comprise the app 140. In some embodiments, the app 140 can comprise one or more software modules that are typically deployed in the context of a mobile operating system, including for example, a Palm® mobile operating system, a Windows® mobile operating system, an Android® operating system, Apple® iOS, or a Blackberry® operating system, and the like. In some embodiments, the app 140 can be configured to leverage the resources of the larger operating system and associated hardware, for example via a set of predetermined rules which govern the operations of various operating systems and hardware resources. For example, where the app 140 is configured or operated to communicate with a device or network other than the corresponding mobile device or mobile operating system, the app 140 can leverage the communication protocol of the operating system and associated device hardware under the predetermined rules of the mobile operating system. Moreover, where the app 140 is configured or operated to receive an input from a user, the app 140 can be configured to request a response from the operating system which monitors various hardware components and then communicates a detected input from the hardware to the app 140. Android® is a registered trademark of Google Incorporated in the United States and/or other countries. Windows® is a registered trademark of the Microsoft Corporation. Blackberry® is a registered trademark of Research in Motion Limited (RIM) Inc., in the United States, and/or other countries. Apple® and Apple® iOS are registered trademarks of Apple, Inc.

In some embodiments, the mobile device 150 can comprise one or more smartphones (for example, smartphones capable of running one or more of an Apple® iOS mobile operating system, an Android® mobile operating system, a Windows® mobile operating system, and/or the like), a tablet computer, a laptop computer, a personal digital assistant, and/or the like. In some further embodiments, the mobile device 150 can also include or comprise a wearable device such as a smart watch, computing and/or sensing devices paired with a smartphone (for example, via Bluetooth®), and/or other conventional wearable computing devices. In some embodiments, the app 140 can be any software application suitable for execution on the mobile device 150. For example, in some embodiments, the app 140 can comprise an application for Apple® iOS devices and/or Android® devices described above. Bluetooth® is a registered trademark of Bluetooth® SIG Inc.

In some embodiments of the invention, the binaural audio system and method 100 can receive audio data from an audio capture system 110 and process at least a portion of the audio data using one or more software modules of the server 120. In some embodiments of the invention, an audio capture system 110 can be any system or components configured to record and/or capture one or more sounds. For example, audio capture system 110 can comprise a microphone coupled to a recording device, such as a computer. In various embodiments described herein, audio capture system 110 comprises a Sennheiser MKE2002 microphone, a Neumann KU-100 microphone, or the like. Moreover, binaural audio system and method 100 can utilize any form of audio input (e.g., mono, stereo, and/or binaural), and is not limited to use of audio inputs having an inherent binaural component as recorded.

In some embodiments, the server 120 can be any system or components configured to facilitate storage, processing, and transmittal of audio information, for example conventional networked computing resources as known in the art. Additionally, it is understood that a "server" or applications thereof can refer to or encompass cloud-based computing resources, applications, and/or services delivered over a network. For example, server 120 can comprise cloud-based storage and/or processing for audio data 128, for example audio data 128 obtained from audio capture system 110.

In some embodiments of the invention, the server 120 can be configured with an audio processing module 125. In some embodiments, the audio processing module 125 can be configured to process audio data 128 to create processed audio data 138. In some embodiments, the processing can include creation or modification of one or more binaural effects, and/or mixing, and/or overlays, and/or crossfades, and/or synthesis, and/or addition and/or subtraction of sounds, and/or level adjustments, and/or clipping, and/or truncation, and/or timbre, and/or pitch, and/or loudness, and/or frequency, and/or any other suitable form of audio modification. In some embodiments, audio processing module 125 can be configured to create (or facilitate creation of) processed audio data 138 in the form of a movie audio track containing binaural effects. Moreover, in some embodiments, processed audio data 138 can be monaural, and/or stereo, and/or binaural, and/or otherwise comprise any suitable audio formats, encodings, and/or content.

In some embodiments, processed audio data 138 includes binaural audio information. For example, in some embodiments of the invention, processed audio data 138 can also include synchronization information (timestamps, etc.), commands or operational instructions for app 140, and/or the like. In some embodiments of the invention, the processed audio data 138 can be stored, transmitted, transcoded, and/or played back in or between any suitable form, format, or codec, for example as a .WAV file, MPEG layer 2 (.mp2), layer 3 (.mp3), or layer 4 (.mp4) file, AAC, Vorbis OGG, Apple® ALAC, FLAC, Windows® media, and/or the like. In some embodiments, processed audio data 138 can be compressed or uncompressed, encrypted and/or unencrypted. In some embodiments, processed audio data 138 can be compressed for transmission to a mobile device 150, and decompressed and/or transcoded on a mobile device 150 (e.g., using the app 140).

In some embodiments of the invention, the server 120 can be configured with an audio delivery module 135. In some embodiments of the invention, the audio delivery module 135 can be configured to deliver processed audio data 138 to the mobile device 150 and app 140. In some embodiments of the invention, the audio delivery module 135 can be configured with various authentication, encryption, and/or access control components in order to ensure secure delivery of processed audio data 138 only to an authorized mobile device 150.

In some embodiments of the invention, the binaural audio system and method 100 can be configured for use during an event 160. In some embodiments, the event 160 can be any event having an audio component, for example a movie, a television program, a streaming media presentation, a facility tour, a sporting event, a theatrical play, and/or the like. It will be appreciated that, while some embodiments discussed herein focus primarily on application of principles of the invention to movies presented in a cinema or theater, such principles are equally applicable to in-home viewing of content on a television, viewing of content on a tablet computer, etc. Additionally, as used herein, an "event" can also be considered to refer to certain capabilities of a venue wherein audiovisual information is presented, for example to pre-installed loudspeakers and the like.

In some embodiments of the invention, with app 140 operative on a mobile device 150, the binaural audio system and method 100 can be configured to permit playback of binaural audio in connection with an event or events 160. It will be appreciated that the binaural audio system and method 100 can be configured to support any number of mobile devices 150-A, 150-B, . . . , 150-N, simultaneously during an event or events 160. In some embodiments of the invention, the app 140 can be configured to obtain processed audio data 138 from server 120, and configured to play back processed audio data 138 in a synchronized manner in connection with an event 160.

In some embodiments of the invention, the app 140 can provides functionality to a user prior to binaural audio playback, and/or during binaural audio playback, and/or after binaural audio playback. For example, in some embodiments, the app 140 can be configured to provide functionality before a user enters an event 160 such as a theater. In this non-limiting example, the app 140 can allow a user to retrieve movie listings, select show-times, and purchase movie tickets. In some embodiments, because the mobile network reception inside a theater is typically poor, and because bandwidth therein is typically limited due to the large number of mobile devices in close proximity, the app 140 can be configured to download at least a portion of the processed audio data 138 associated with an event 160 prior to the start of event 160. In some embodiments, using this procedure, at least some or all of the processed audio data 138 associated with an event 160 can be stored on mobile device 150, and can be ready for playback via app 140 during the event 160. Thus, in certain embodiments of the invention, at least a portion of the processed audio data 138 associated with an event 160 can be pre-downloaded, and another portion of the processed audio data 138 can be downloaded during the event 160. In some embodiments of the invention, the app 140 can provide a download status indication, such as via a progress bar or numerical indicator.

In some embodiments of the invention, once a user has purchased a movie ticket, the app 140 can send reminders about the upcoming show, and encourage the user to complete download of processed audio data 138 prior to entering the theater. In some further embodiments of the invention, once a user is in the theater, the app 140 can welcome the user and provide information about the upcoming event 160. Additionally, in some embodiments, the app 140 can provide basic technical information about the operation of binaural audio system and method 100, and prompt the user to put on their headphones and prepare to experience binaural audio. In some embodiments, the user can select a particular event 160 within a menu in app 140; alternatively, the app 140 can automatically select an event 160, for example based on GPS information from mobile device 150, time information, nearby location beacons, and/or the like.

Figure 2:
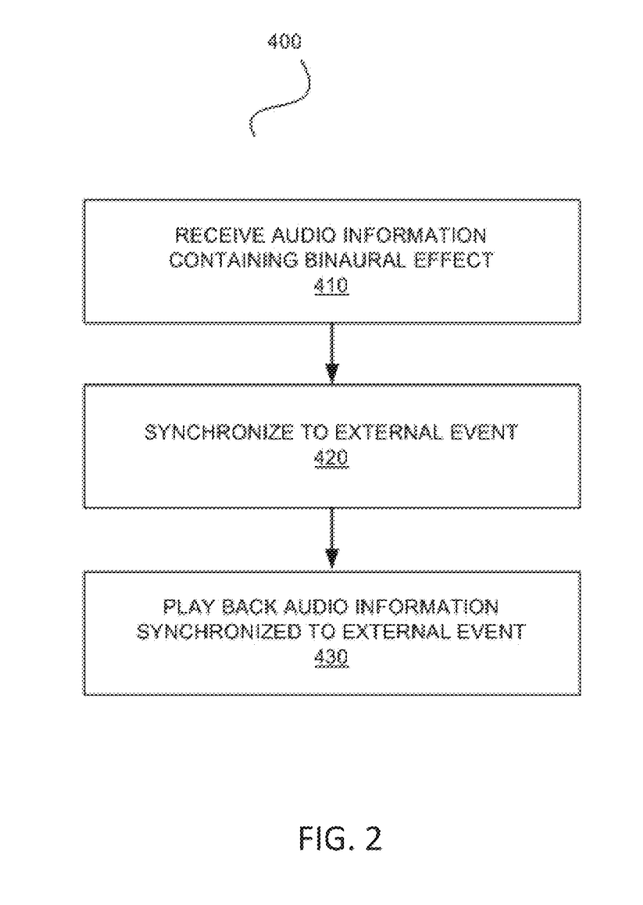
FIG. 2 illustrates a method for binaural audio presentation in accordance with various embodiments of the invention.

In some further embodiments, the app 140 can be configured to deliver binaural audio in a synchronized manner. Stated another way, in some embodiments, playback of binaural audio via app 140 can be synchronized to event 160 or to another suitable synchronization target. Referring to FIG. 2, some embodiments include a method 400 for binaural audio presentation comprises receiving, at a mobile device, audio information containing a binaural effect (step 410); synchronizing, to an external event, playback of the audio information (step 420); and playing back the audio information via headphones coupled to the mobile device (step 430). In some embodiments of the invention, the app 140 can be configured to sync binaural audio playback to an event 160 via an audio sync signal 161 presented in connection with event 160. For example, in some embodiments, the audio sync signal 161 can be delivered via any suitable audible sound generation apparatus. For example, some embodiments include an audio signal 161 delivered via an existing loudspeaker implementation, e.g., such as loudspeakers pre-installed in a movie theater. In some embodiments, this can improve the technical capabilities and functioning of theater loudspeakers and associated control electronics, by enabling simultaneous delivery of the audio sync signal 161 together with conventional audio information for a movie.

In some embodiments of the invention, the audio sync signal 161 can be encoded, for example, into the conventional audio and/or video track of a movie, and played back via the theater loudspeakers. In one embodiment of the invention, the audio sync signal 161 can be encoded and/or delivered at a frequency or set of frequencies of between about 17.9 kHz and about 20 kHz, and preferably about 19 kHz. In this manner, the audio sync signal 161 can be unobtrusive and/or unnoticeable to theatergoers listening to the conventional audio track, while still being suitable for delivery and reception via conventional loudspeakers and microphones. In some embodiments, the audio sync signal 161 can be encoded and/or delivered at a frequency or set of frequencies of between about 2 Hz and about 120 Hz. In some embodiments, the audio sync signal 161 can be encoded and/or delivered at a frequency or set of frequencies of between about 120 Hz and about 17.9 kHz (in other words, a typical range of human hearing). In other embodiments of the invention, the audio sync signal 161 can be encoded and/or delivered at a frequency or set of frequencies of between about 20 kHz and about 25 kHz (i.e., above the range of typical human hearing). In some embodiments of the invention, the audio sync signal 161 can be delivered via a custom loudspeaker mounted to a theater ceiling and configured to deliver high-frequency signals above 20 kHz. Moreover, any frequency or range or set of frequencies can be utilized, as suitable, in order to form, encode, and/or deliver audio sync signal 161.

In some embodiments of the invention, in order to minimize and/or eliminate audience perception of the presence of audio sync signal 161, the audio sync signal 161 can be presented at a level of between about −5 dB and about +10 dB in the mix (i.e., compared to other audio information emitted from the loudspeaker). In some embodiments of the invention, the level of about 0 dB in the mix can be delivered. In other embodiments, the audio sync signal 161 can permit synchronization between the binaural audio playback via app 140 and event 160 within an accuracy of about 1 millisecond or less. In some further embodiments, the accuracy is above about 1 millisecond.

In some embodiments of the invention, the audio sync signal 161 can be at least partially "masked" and/or concealed by conventional aspects of an audio presentation, for example, a movie soundtrack delivered via loudspeakers in a theater. For example, in some embodiments, an audio sync signal 161 or portions thereof can be presented during portions of a soundtrack having loud and/or high-frequency content, for example gunshots, explosions, breaking glass, screams, and/or the like. It will be appreciated that in some embodiments, the audio sync signal 161 can be presented over various frequencies and/or at varying volumes, for example in order to remain unobtrusive when presented in connection with a movie soundtrack. Moreover, in some embodiments, by presenting audio sync signal 161 at a louder volume, the audio sync signal 161 can be more effectively delivered to mobile devices 150, particularly mobile devices 150 that include lower-quality microphone components, and/or microphone components having a limited range of sensitivity and/or frequency response.

In some embodiments of the invention, the audio sync signal 161 can be received at the mobile device 150, (e.g., via one or more built-in microphones 151 typically utilized for voice calls), and processed by app 140. In some embodiments, the audio sync signal 161 can also be received via a microphone or microphones, such as an omnidirectional microphone, integrated into headphones and coupled to the mobile device 150. In some embodiments, the app 140 can utilize audio sync signal 161 to synchronize playback of processed audio data 138 to event 160. In some embodiments, upon successful synchronization, the app 140 can provide confirmation of audio sync to the user. In some embodiments, upon a synchronization error or series of errors, the app 140 can provide an error message and suggest the user seek assistance from a theater representative.

In some embodiments of the invention, the audio sync signal 161 can be repeated at a regular interval in order to allow re-synchronization of processed audio data 138 as needed. For example, in some embodiments, a theatergoer can exit a theater to purchase refreshments, make a telephone call, or utilize restroom facilities. After exiting the theater, the playback of processed audio data 138 on a mobile device 150 can fall out-of-sync with the video portion of event 160. After the theatergoer returns to the theater (and thus to the presence of audio sync signal 161), the app 140 can re-synchronize playback of processed audio data 138 at an appropriate temporal location. In some other embodiments, the audio sync signal 161 can repeat over a five-second interval. In some further embodiments, the audio sync signal 161 can repeat over a ten-second interval. In some further embodiments, the audio sync signal 161 can repeat over a thirty-second interval. Moreover, in some embodiments, any suitable interval can be selected, in order to allow prompt synchronization and/or resynchronization of audio playback between app 140 and event 160.

In some embodiments, the audio sync signal 161 can be encoded utilizing multiple frequencies over time. For example, in some embodiments, the audio sync signal 161 can utilize various frequencies to represent and/or correspond to numbers and/or track identifiers. In some further embodiments of the invention, the audio sync signal 161 can utilize at least one or more of the following identifiers:

Track 1=19400 Hz
Track 2=19300 Hz
Track 3=19200 Hz
Track 4=19100 Hz
Number 0=19700 Hz
Number 1=19720 Hz
Number 2=19740 Hz
Number 3=19760 Hz
Number 4=19780 Hz
Number 5=19800 Hz
Number 6=19820 Hz
Number 7=19840 Hz
Number 8=19860 Hz
Number 9=19880 Hz
Number Repeat=19900 Hz
Time Stamp Marker=19950 Hz In some other embodiments of the invention, the audio sync signal 161 can utilize at least one or more of the following identifiers:

Track 1=18200 Hz
Track 2=18100 Hz
Track 3=18000 Hz
Track 4=17900 Hz
Number 0=18240 Hz
Number 1=18260 Hz
Number 2=18280 Hz
Number 3=18300 Hz
Number 4=18320 Hz
Number 5=18340 Hz
Number 6=18360 Hz
Number 7=18380 Hz
Number 8=18400 Hz
Number 9=18420 Hz
Number Repeat=18440 Hz
Time Stamp Marker=18480 Hz It can be appreciated that any one or more of the foregoing identifiers can be emitted from a loudspeaker as a tone or series of tones having a corresponding frequency. In other embodiments of the invention, the time stamp information in the audio sync signal 161 can be delivered as a four digit (front padded) number representing the number of seconds from the beginning of processed audio data 138 where playback should occur. In some further embodiments, additional digits or fewer digits can be utilized. In some embodiments, the digits can be sent in an order, for example from least significant digit to most significant digit. In an embodiment where audio sync signal 161 utilizes a 5 second repeat configuration, the time stamp can be sent during the 5 second block as follows:

Second 1—send stamp 1
Second 2—send stamp 2
Second 3—send stamp 3
Second 4—send track frequency
Second 5—first 0.2 seconds transmit stamp marker. Final 0.8 seconds, transmit track frequency.

In some embodiments, during the first three seconds, when stamps are sent, the following format can be used during each second:

First 0.2 seconds—track frequency
Second 0.2 seconds—frequency representing time digit 1
Third 0.2 seconds—frequency representing time digit 2
Fourth 0.2 seconds—frequency representing time digit 3
Fifth (final) 0.2 seconds—frequency representing time digit 4

In some embodiments of the invention, if two consecutive digits in a time value are the same, a repeat frequency can be used to represent the second digit in the repeating pair. In some embodiments, if three consecutive digits are the same, the standard digit frequency can be used to represent the third digit in the repeated triple. For example, in some embodiments, if time digits 2, 3, and 4 each have a numerical value of 5, a corresponding portion of audio sync signal 161 can be encoded with a frequency of 19800 Hz to represent time digit 2 having a value of 5, a frequency of 19900 Hz to represent time digit 3 having a value of 5, and a frequency of 19800 Hz to represent time digit 4 having a value of 5. In this manner, in some embodiments, repeated digits can be effectively identified and communicated, without confusion as to when a digit begins and ends.

In some embodiments of the invention, the binaural audio system and method 100 can be configured to account for, compensate for, and/or adjust or correct synchronization differences or delays between playback of processed audio data 138 on mobile device 150 and local audio delivered via a theater loudspeaker. For example, in some embodiments, a certain mobile device 150 utilizing an Android® brand operating system can have a playback delay differing from a mobile device 150 utilizing an iOS® operating system; stated another way, differences in mobile device 150 hardware and/or software can and do affect the timing of playback of processed audio data 138 stored thereon.

Figure 3:
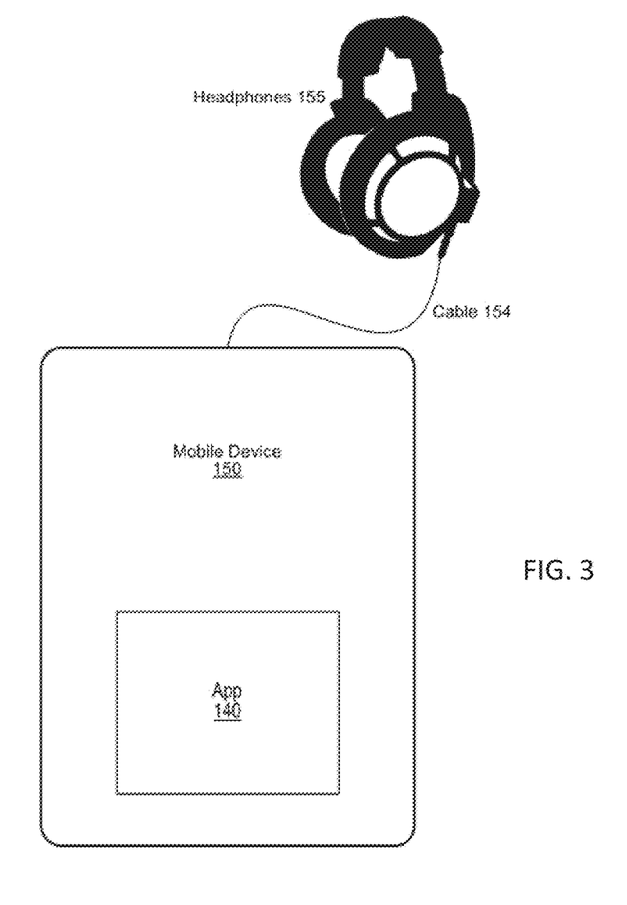
FIG. 3 illustrates components for binaural audio reception, storage, and playback in accordance with various embodiments of the invention.

Referring to FIG. 3, showing components for binaural audio reception, storage, and playback in accordance with various embodiments of the invention, in some embodiments, the binaural audio system and method 100 can be configured to deliver audio to headphones 155. In some further embodiments of the invention, the app 140 can be configured to control and/or communicate with headphones 155, for example in order to activate vibration capabilities or other advanced features. In some embodiments, when playback from a mobile device 150 via headphones 155 is slightly out of sync, for example with a corresponding conventional movie soundtrack delivered via theater loudspeakers, an unpleasant "echo"-like effect can be perceptible to the listener, even through large and/or well-isolated headphones. Accordingly, in some embodiments, processed audio data 138 can be configured with customization information to cancel out, buffer, and/or otherwise correct for differences between playback via app 140 and local audio presented in a theater. For example, for a particular movie, binaural audio system and method 100 can deliver a first file of processed audio data 138 to an Android® device, and a second file of processed audio data 138 to an iOS device; differences between the files can reflect variations in playback speeds, delays, etc., processing instructions for app 140, and/or any other suitable adjustments or commands for ensuring playback of processed audio data 138 on a particular mobile device 150 remains in sync.

In some embodiments of the invention, the app 140 can be configured to alter and/or adjust the rate of playback of processed audio data 138, for example depending on a characteristic of mobile device 150, in order to become synchronized with (and/or remain in synchronization with) local audio and/or presentation of visual data. Moreover, in some embodiments, in addition to the inclusion of audio sync signal 161, audio information presented by theater loudspeakers can include various beacons, timestamps, and/or the like, to facilitate fine-tuning and/or other adjustments to synchronization and/or playback. For example, in some embodiments, the audio information presented by theater loudspeakers can include a high-frequency test or "heartbeat" tone presented on a repeating basis, for example every 60 seconds from the beginning of a movie. In some embodiments, the app 140 can detect the heartbeat tone and compare the timing of this received tone to the current location of playback of processed audio data 138. For example, in some embodiments, the app 140 can detect the beginning of a heartbeat tone (representing a 60 second interval) at a point when app 140 has only played back 59.9 seconds of processed audio data 138 since the beginning of the last heartbeat tone. In some embodiments, the app 140 can utilize this discrepancy to adjust the position and/or rate of playback of processed audio data 138. Other suitable approaches for time-stamping and/or correcting synchronization issues can also be employed in order to avoid unpleasant echo or other de-synchronized audio artifacts.

Some embodiments include audio synchronization between app 140 and event 160, and the audio sync signal 161 can also contain commands or instructions to app 140, for example instructions to activate or deactivate features or capabilities of mobile device 150, instructions to raise or lower playback volume, and/or the like. Accordingly, in some embodiments, the audio sync signal 161 can be utilized to further refine and/or customize the experience for a user of app 140.

In some other embodiments of the invention, the app 140 can be configured to sync binaural audio playback to an event 160 via a local radio frequency (RF) signal, for example a signal transmitted from an RF transmitter associated with or linked to a movie projector. In some further embodiments, the local RF signal can be received at mobile device 150, and utilized by app 140 for synchronization and/or commands, in a manner analogous to how audio sync signal 161 can be utilized. In some embodiments, the RF can comprise a Bluetooth RF signal. For example, some embodiments can include Bluetooth low energy such as Bluetooth LE, BLE, or Bluetooth Smart.

In other embodiments of the invention, the app 140 can be configured to sync binaural audio playback to event 160 via a mobile network carrier connection to a synchronization server. In some embodiments, this can occur via a global time synchronization signal (network time signal) delivered by a mobile network carrier to mobile device 150, via a time synchronization handshake between mobile device 150 and server 120 or other server, or via any other suitable network-based synchronization method.

In still other embodiments of the invention, the app 140 can be configured to sync binaural audio playback to event 160 via synchronization signals delivered to mobile device 150 via infrared light, for example infrared light emitted from and/or modulated by an infrared light source disposed on the ceiling of a theater.

In addition to synchronization capabilities, in various embodiments of the invention, the app 140 can be configured to support processed audio data 138 in multiple audio languages. In other words, in some embodiments, the app 140 can be configured to allow a first mobile device 150-A to play back binaural audio in a first language in connection with an event 160, while a second mobile device 150-B plays back binaural audio in a second language in connection with the same event 160. Stated another way, in some embodiments, the app 140 can permit moviegoers in the same theater to watch a movie in multiple languages at the same time. Thus, in some embodiments, a cinema can accommodate moviegoers speaking various languages to each experience a movie presentation in their preferred language, simultaneously.

In some embodiments, the app 140 can also be configured to support simultaneous playback of processed audio data 138 for users in different physical locations. For example, in some embodiments, in connection with a live sporting event, users of the app 140 distributed across the country can receive associated processed audio data 138, and each app 140 can play back the processed audio data 138 in synchronization with the live sporting event.

In some embodiments of the invention, the app 140 can support multiple language capabilities via downloading of processed audio data 138. For example, in some embodiments, a first user utilizing app 140 can select "English" for a particular download of processed audio data 138 associated with an event 160, and the selected processed audio data 138 can be subsequently downloaded to mobile device 150 of the first user. In some further embodiments, a second user of app 140 can select "Spanish" for processed audio data 138 associated with the same event 160, and that user can receive corresponding processed audio data 138 at his or her mobile device 150. In some further embodiments, a third user of app 140 can select "Mandarin" and receive corresponding processed audio data 138 at his or her mobile device 150, and so forth. During event 160, the first user can listen to the English track, and the second user can listen to the Spanish track, and the third user can listen to the Mandarin track, and so forth. Any number of languages can be supported, for example via preparation of corresponding processed audio data 138 for each language.

Additionally, in some embodiments of the invention, the app 140 can be configured with rating and/or feedback capabilities. For example, in some embodiments, the app 140 can be configured with social media integration to allow a user to share and/or comment on the experience of viewing a movie in connection with binaural audio system and method 100. In some embodiments of the invention, the app 140 can also permit a user to rate the movie, or provide comments to a director or movie studio. In various embodiments of the invention, the app 140 can be coupled via an application programming interface (API) to one or more of Fandango, IMDB, RottenTomatoes, or the like in order to facilitate sharing of feedback or ratings. Fandango® is a registered trademark of Fandango, LLC. IMDb Services are trademarks of IMDb in the United States and/or other countries. Rotten Tomatoes® is a registered trademark of Flixster Inc.

In some embodiments of the invention, the app 140 can be configured to support "push" notifications. For example, in some embodiments, the app 140 can be configured to display messages or offers localized for a particular theater or event. Additionally, in some embodiments of the invention, the app 140 can be configured to display in-app advertising, for example advertising targeted based on user demographics, location, gender, age, residential information, media viewing history, ratings, and/or combination thereof. In this manner, the app 140 can facilitate improved monetization of a customer while the customer is at the theater or otherwise at a location or time where a purchase is likely.

In some embodiments, the app 140 can be configured to support coupon functionality. For example, after viewing an event 160 such as a movie, a user of app 140 can be presented with offers for nearby restaurants or services. The offers can be tailored, for example based on GPS or accelerometer information from corresponding mobile device 150.

In some embodiments, the app 140 can offer in-app purchase functionality. For example, in addition to being able to purchase synchronized binaural audio associated with an event 160, in some embodiments, a user can be enabled to purchase various other audio content, such as binaural beats for brainwave entrainment (also known as "i-dosing"). In some embodiments, a user can also be able, via app 140, to place an order or pre-order for concessions or other refreshments from a theater, enabling faster-moving concessions lines or even direct delivery to the user's seat in the theater.

In various embodiments of the invention, the app 140 can be configured for one or more biofeedback and/or biomonitoring functions. For example, in some embodiments, the app 140 can be configured to utilize sensors of mobile device 150 or linked thereto (for example, a linked smartwatch, fitness band, and/or the like, and used with an added or integrated heart rate sensor, thermometer, accelerometer). In some further embodiments, the app 140 can evaluate a user's physical response to playback of processed audio data 138. In some embodiments, the app 140 can further modify processed audio data 138, for example by varying a volume level or selecting a branching storyline of an audio/visual presentation, responsive to the user's physical response.

In some embodiments of the invention, the headphones 155 can comprise any suitable personal loudspeaker system suitable for playback of binaural audio. In various embodiments of the invention, the headphones 155 can comprise on-ear, over-the ear, or in-ear headphones. In some embodiments of the invention, the headphones 155 can be coupled to mobile device 150 via a cable 154; alternatively, the headphones 155 can be coupled to mobile device 150 via a short-range wireless connection, for example Bluetooth® or the like. In various embodiments, the headphones 155 can comprise dipolar inverted drivers having a diameter of 50 mm or more, in order to present binaural audio effects of heightened accuracy and precision. Blue-Tooth® is a registered trademark of Bluetooth® SIG Inc.

In some embodiments of the invention, the cable 154 can comprise any conventional cable suitable for conveying binaural audio data between a mobile device 150 and a set of headphones 155. In various embodiments, the cable 154 comprises a standard 3.5 mm (⅛") audio cable. In other embodiments, where two-way communication and/or control between the mobile device 150 and the headphones 155 is implemented, the cable 154 can comprise a Universal Serial Bus (USB)-compatible cable, an Apple Lightning® compatible cable, or other suitable communications cable.

Figure 4:
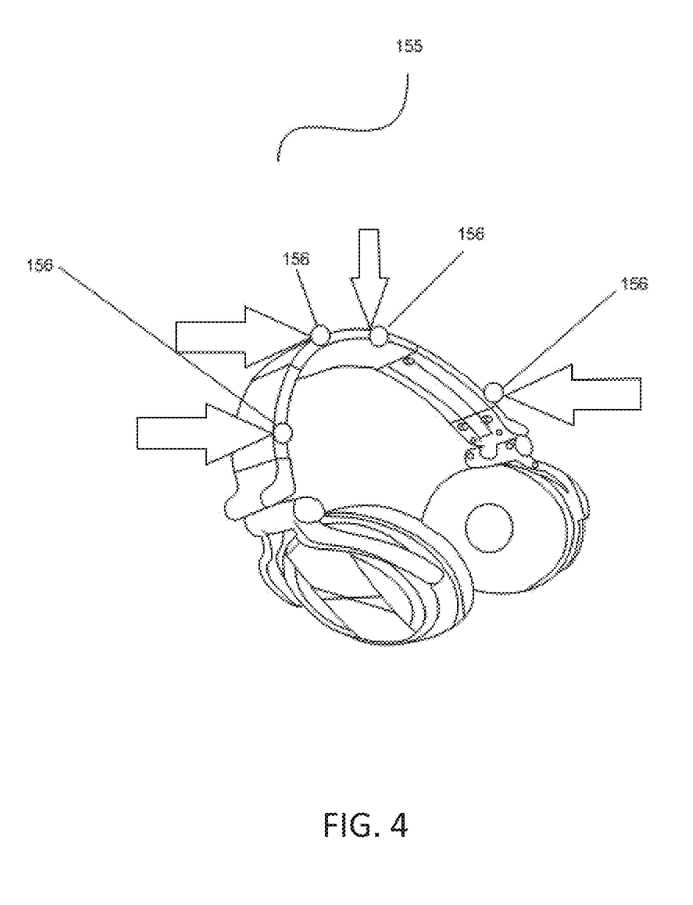
FIG. 4 illustrates headphones configured with microphones in accordance with various embodiments of the invention.

In some embodiments, the headphones 155 can be configured with advanced functionality, for example one or more headphone mounted microphones 156, vibration capability, and/or the like. In some embodiments, the headphone mounted microphone(s) 156 can be positioned in an order to ensure clear reception of audio sync signal 161, particularly when the mobile device 150 is stored in a pocket, case, purse, or otherwise in a position where audio sync signal 161 can have difficulty reaching the mobile device 150. As depicted in FIG. 4, in one embodiment of the invention, the headphones 155 can comprise four headphone mounted microphones 156 disposed on the sides and top of headphones 155. In some embodiments, the headphone mounted microphones 156 can be wired in series and coupled and grounded to mobile device 150 as a single microphone input. However, in some embodiments, any suitable number of microphones can be utilized in any suitable locations.

In addition to enabling synchronization of binaural audio, and enabling simultaneous multi-language functionality, in some embodiments, the binaural audio system and method 100 can be configured to support and/or facilitate various interactive, marketing, personalization, localization, and/or commerce capabilities. For example, in various embodiments of the invention, the app 140 can be configured to implement one or more interactive activities associated with playback of a particular item of media, such as a movie. In some embodiments, the app 140 can be configured to implement a "scared selfie" functionality. For example, in some embodiments of the invention, as a movie presentation approaches a particular scene or timestamp, via audible, tactile, and/or visual prompting from the app 140, the user can be prompted to hold mobile device 150 such that the user is looking both at the movie screen and the mobile device screen. A prompt can be through on-screen instructions displayed via the app 140, via content in the movie, via vibration of mobile device 150, or via any other suitable method or combinations thereof. In some embodiments, at a precise moment in the film, for example a particularly shocking or unexpected moment, the app 140 can display a bright white screen on mobile device 150 to increase local illumination of the user's face, and takes a photo of the user via a front-facing camera of mobile device 150. The resulting "scared selfie" photograph can be stored or shared, for example via social media integration in app 140 or via conventional capabilities of mobile device 150.

In addition to the embodiments described above, it will be appreciated that the binaural audio system and method 100 be used with an audio synchronization signal that can be delivered via the second audio program (SAP) channel of a television broadcast, in order to synchronize playback of locally stored binaural audio information. Additionally, in some embodiments, synchronized binaural audio can be presented in connection with an interactive amusement park ride, museum tour, and/or the like. Yet further, synchronized binaural audio can be captured and/or played back in connection with sporting events, for example binaural audio obtained from the inside of a race car during a race and transmitted to race viewers for synchronized local playback.

As will be appreciated by one of ordinary skill in the art, one or more binaural audio system and method 100 components can be embodied as a customization of an existing system, an add-on product, upgraded software, a distributed system, a method, a data processing system, a device for data processing, and/or a computer program product. Accordingly, in some embodiments, an individual binaural audio system and method 100 components can take the form of an entirely software embodiment, an entirely hardware embodiment, or an embodiment combining aspects of both software and hardware. Furthermore, in some embodiments, an individual binaural audio system and method 100 components can take the form of a computer program product on a non-transitory computer-readable storage medium having computer-readable program code means embodied in the storage medium. Any suitable computer-readable storage medium can be utilized, including magnetic storage devices (e.g., hard disks), optical storage devices, (e.g., DVD-ROM, CD-ROM, etc.), electronic storage devices (e.g., flash memory), and/or the like.

Figure 5:
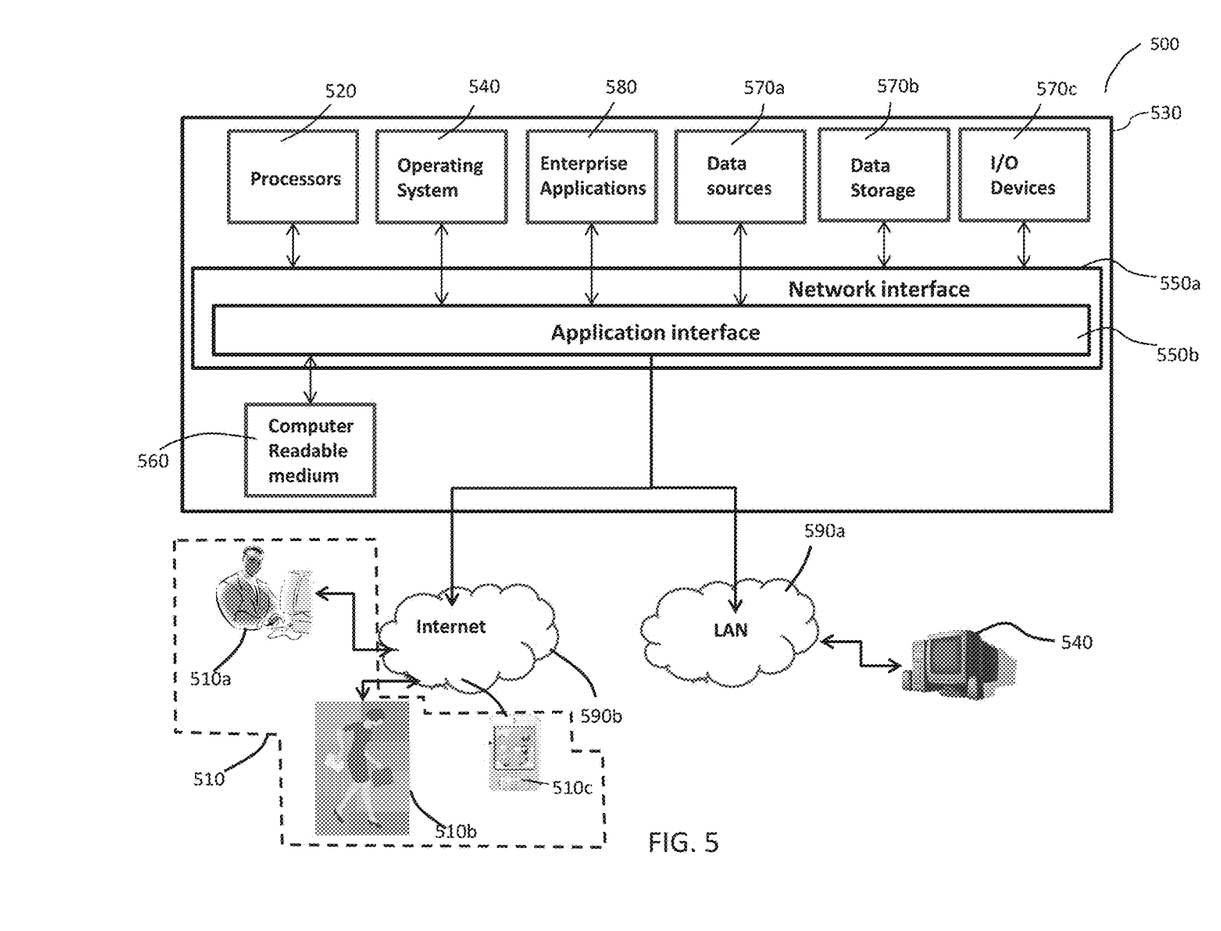
FIG. 5 illustrates a computer system configured for operating and processing components of the binaural audio system and method in accordance with some embodiments of the invention.

FIG. 5 illustrates a computer system 500 configured for operating and processing components of the binaural audio system and method 100 in accordance with some embodiments of the invention. For example, in some embodiments of the invention, the server 120 can include or comprise the computer system 500 of FIG. 5. In some embodiments, the computer system 500 can process one or more software modules of the aforementioned binaural audio system and method 100 applications, and can be configured to display information related to binaural audio within one or more graphical user interfaces. Further, in some embodiments, the computer system 500 can also manage the organization of data and data flow between services of the binaural audio system and method 100 services, and one or more external (third party) computer systems.

In some embodiments, the system 500 can comprise at least one computing device including at least one processor 520. In some embodiments, the at least one processor 520 can include a processor residing in or coupled to one or more server platforms. In some embodiments, the system 500 can include a network interface 550a and an application interface 550b coupled to the least one processor 520 capable of processing at least one operating system 534. Further, in some embodiments, the interfaces 550a, 550b coupled to at least one processor 520 can be configured to process one or more of the software modules (e.g., such as enterprise applications 580). In some embodiments, the software modules 580 can include server-based software that can include binaural audio system and method 100 software modules. In some embodiments, the software modules 580 can operate to host at least one user account and/or at least one client account, and operating to transfer data between one or more of these accounts using the at least one processor 520.

With the above embodiments in mind, it should be understood that the invention can employ various computer-implemented operations involving binaural audio system and method 100 data stored in computer systems. Moreover, the above-described databases and models throughout the binaural audio system and method 100 can store analytical models and other data on computer-readable storage media within the system 500 and on computer-readable storage media coupled to the system 500. In addition, the above-described applications of the binaural audio system and method 100 can be stored on computer-readable storage media within the system 500 and on computer-readable storage media coupled to the system 500. These operations are those requiring physical manipulation of physical quantities. Usually, though not necessarily, these quantities take the form of electrical, electromagnetic, or magnetic signals, optical or magneto-optical form capable of being stored, transferred, combined, compared and otherwise manipulated. In some embodiments of the invention, the system 500 can comprise at least one computer readable medium 560 coupled to at least one data source 570a, and/or at least one data storage device 570b, and/or at least one input/output device 570c. In some embodiments, the invention can be embodied as computer readable code on a computer readable medium 560. In some embodiments, the computer readable medium 560 can be any data storage device that can store data, which can thereafter be read by a computer system (such as the system 500). In some embodiments, the computer readable medium 560 can be any physical or material medium that can be used to tangibly store the information or data or instructions and which can be accessed by a computer or processor 520. In some embodiments, the computer readable medium 560 can include hard drives, network attached storage (NAS), read-only memory, random-access memory, FLASH based memory, CD-ROMs, CD-Rs, CD-RWs, DVDs, magnetic tapes, other optical and non-optical data storage devices. In some embodiments, various other forms of computer-readable media 560 can transmit or carry instructions to a computer 540 and/or at least one user 510, including a router, private or public network, or other transmission device or channel, both wired and wireless. In some embodiments, the software modules 580 can be configured to send and receive data from a database (e.g., from a computer readable medium 560 including data sources 570a and data storage 570b that can comprise a database), and data can be received by the software modules 580 from at least one other source. In some embodiments, at least one of the software modules 580 can be configured within the system to output data to at least one user 510 via at least one graphical user interface rendered on at least one digital display.

In some embodiments of the invention, the computer readable medium 560 can be distributed over a conventional computer network via the network interface 550a where the binaural audio system and method 100 embodied by the computer readable code can be stored and executed in a distributed fashion. For example, in some embodiments, one or more components of the system 500 can be coupled to send and/or receive data through a local area network ("LAN") 590*a*. In some further embodiments, the networks 590*a*, 590*b* can include wide area networks ("WAN"), direct connections (e.g., through a universal serial bus port), or other forms of computer-readable media 560, or any combination thereof.

In some embodiments, components of the networks 590*a*, 590*b* can include any number of user devices such as personal computers 540 including for example desktop computers, and/or laptop computers, or any fixed, generally non-mobile internet appliances coupled through the LAN 590*a*. In some embodiments, personal computers 540 coupled through the LAN 590*a* can be configured for any type of user including an administrator. In some further embodiments, one or more components of the system 500 can be coupled to send or receive data through an internet 590*b* (e.g., a wireless internet). For example, some embodiments include at least one user 510 coupled wirelessly and accessing one or more software modules of the binaural audio system and method 100 including at least one enterprise application 580 via an input and output ("I/O") device 570*c*. In some other embodiments, the system 500 can enable at least one user 510 to be coupled to access enterprise applications 580 via an I/O device 570*c* through LAN 590*a*. In some embodiments, the user 510 can comprise a user 510*a* coupled to the system 500 using a desktop computer, and/or laptop computers, or any fixed, generally non-mobile internet appliances coupled through the internet 590*b*. In some further embodiments, the user 510 can comprise a mobile user 510*b* coupled to the system 500. In some embodiments, the user 510*b* can use any mobile computing device 510*c* to wireless coupled to the system 500, including, but not limited to, personal digital assistants, and/or cellular phones, mobile phones, or smart phones, and/or pagers, and/or digital tablets, and/or fixed or mobile internet appliances.

In some embodiments, the system 500 can enable one or more users 510 coupled to receive, analyze, input, modify, create and send data to and from the system 500, including to and from one or more enterprise applications 580 running on the system 500. In some embodiments, at least one software application 580 running on one or more processors 520 can be configured to be coupled for communication over networks 590*a*, 590*b* through the internet 590*b*. In some embodiments, one or more wired or wirelessly coupled components of the network 590*a*, 590*b* can include one or more resources for data storage. For example, this can include any other form of computer readable media in addition to the computer readable media 560 for storing information, and can include any form of computer readable media for communicating information from one electronic device to another electronic device.

Any of the operations described herein that form part of the invention are useful machine operations. The invention also relates to a device or an apparatus for performing these operations. The apparatus can be specially constructed for the required purpose, such as a special purpose computer. When defined as a special purpose computer, the computer can also perform other processing, program execution or routines that are not part of the special purpose, while still being capable of operating for the special purpose. Alternatively, the operations can be processed by a general purpose computer selectively activated or configured by one or more computer programs stored in the computer memory, cache, or obtained over a network. When data is obtained over a network the data can be processed by other computers on the network, e.g. a cloud of computing resources.

The embodiments of the present invention can also be defined as a machine that transforms data from one state to another state. The data can represent an article, that can be represented as an electronic signal and electronically manipulate data. The transformed data can, in some cases, be visually depicted on a display, representing the physical object that results from the transformation of data. The transformed data can be saved to storage generally or in particular formats that enable the construction or depiction of a physical and tangible object. In some embodiments, the manipulation can be performed by a processor. In such an example, the processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine. Computer-readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data.

Although method operations can be described in a specific order, it should be understood that other housekeeping operations can be performed in between operations, or operations can be adjusted so that they occur at slightly different times, or can be distributed in a system which allows the occurrence of the processing operations at various intervals associated with the processing, as long as the processing of the overlay operations are performed.

Some embodiments include systems and methods that can be described herein in terms of functional block components, screen shots, optional selections and various processing steps. It should be appreciated that such functional blocks can be realized by any number of hardware and/or software components configured to perform the specified functions. For example, the system can employ various integrated circuit components, e.g., memory elements, processing elements, logic elements, look-up tables, and the like, which can carry out a variety of functions under the control of one or more microprocessors or other control devices. Similarly, the software elements of the system (e.g., including one or more components of the app 140, and/or any software application processed on the server 120) can be implemented with any programming or scripting language such as C, C++, C#, Java, JavaScript, Flash, ActionScript, FLEX, VBScript, Macromedia Cold Fusion, COBOL, Microsoft Active Server Pages, assembly, PERL, SAS, PHP, awk, Python, Visual Basic, SQL Stored Procedures, PL/SQL, any UNIX shell script, and/or extensible markup language (XML) or the like, with the various algorithms being implemented with any combination of data structures, objects, processes, routines or other programming elements. Further, it should be noted that the system can employ any number of conventional techniques for data transmission, signaling, data processing, network control, or the like.

Accordingly, in some embodiments of the invention, functional blocks of the block diagrams and flowchart illustrations support combinations of means for performing the specified functions, combinations of steps for performing the specified functions, and program instruction means for performing the specified functions. It will also be understood that in some embodiments, each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions (as described earlier). Further, illustrations of the process flows and the descriptions thereof can make reference to user windows, mobile applications, web sites, etc. Practitioners will appreciate that the illustrated steps described herein can comprise any number of configurations thereof. It should be further appreciated that the multiple steps as illustrated and described can be combined into single web pages, mobile application screens, and/or windows but have been expanded for the sake of simplicity. In other cases, steps illustrated and described as single process steps can be separated into multiple web pages, application screens and/or windows but have been combined for simplicity.

While the embodiments described herein are described in sufficient detail to enable those skilled in the art to practice principles of the invention, it should be understood that other embodiments can be realized and that logical and/or functional changes can be made without departing from the spirit and scope of the invention. Thus, the detailed description herein is presented for purposes of illustration and not of limitation.

While the description references specific technologies, system architectures and data management techniques, practitioners will appreciate that this description is of various embodiments, and that other devices and/or methods can be implemented without departing from the scope of principles of the invention. Similarly, while the description references a user interfacing with the system via a computer user interface, practitioners will appreciate that other interfaces can include mobile devices, kiosks and handheld devices such as mobile phones, smart phones, tablet computing devices, etc.

While the steps outlined herein represent embodiments of principles of the invention, practitioners will appreciate that there are any number of computing algorithms and user interfaces that can be applied to create similar results. The steps are presented for the sake of explanation only and are not intended to limit the scope of the invention in any way. Benefits, other advantages, and solutions to problems have been described herein with regard to specific embodiments. However, the benefits, advantages, solutions to problems, and any element(s) that can cause any benefit, advantage, or solution to occur or become more pronounced are not to be construed as critical, required, or essential features or elements of any or all of the claims.

Systems, methods and computer program products are provided. In the detailed description herein, references to "various embodiments", "one embodiment", "an embodiment", "an example embodiment", etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement principles of the disclosure in alternative embodiments.

It should be understood that the detailed description and specific examples, indicating embodiments, are given for purposes of illustration only and not as limitations. Many changes and modifications can be made without departing from the spirit thereof, and principles of the invention include all such modifications. Corresponding structures, materials, acts, and equivalents of all elements are intended to include any structure, material, or acts for performing the functions in combination with other elements. Reference to an element in the singular is not intended to mean "one and only one" unless explicitly so stated, but rather "one or more." Moreover, when a phrase similar to "at least one of A, B, or C" or "at least one of A, B, and C" is used in the claims or the specification, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A system for delivery of binaural audio to a consumer comprising:
    a computing device comprising at least one processor;
    a non-transitory computer readable medium, having stored thereon, instructions that when executed by the computing device, cause the computing device to perform operations for delivery of the binaural audio to the consumer through at least one consumer device, wherein at least some of the operations occur within the at least one consumer device, the operations comprising:
    enabling a delivery server to associate the at least one consumer device with at least one binaural audio file associated with at least a portion of an event attended by the consumer;
    enabling the at least one consumer device to retrieve and download at least a portion of the at least one binaural audio file from the delivery server;
    receiving, at the at least one consumer device, synchronization information associated with at least a portion of the event and the at least one binaural audio file; and
    processing the at least one binaural audio file and delivering audio through an audio emitting device coupled to the at least one consumer device, wherein the delivered audio is synchronized with at least a portion of the event; and
    wherein a position and rate of playback of processed audio data depends at least in part on a characteristic of the at least one consumer device.

2. The system of claim 1, wherein at least some of the operations cause the delivery server to access or record at least a portion of a live or previously recorded audio file associated with the event.

3. The system of claim 2, wherein at least some of the operations cause the delivery server to process or convert at least a portion of the audio file to the at least one binaural audio file.

4. The system of claim 1, wherein the at least one binaural audio file is delivered to the at least one consumer device prior to the event.

5. The system of claim 1, wherein at least a portion of the at least one binaural audio file is delivered to the at least one consumer device during the event.

6. The system of claim 1, wherein the synchronizing is accomplished via an audio sync signal emitted from loudspeakers in a venue for the event.

7. The system of claim 6, wherein the audio sync signal encodes a series of tones representing an audio offset value, the series of tones comprising different frequencies representing consecutive identical digits in the audio offset value.

8. The system of claim 6, further comprising re-synchronizing of the delivered audio while the event is in progress.

9. The system of claim 1, wherein the synchronization information comprises audio information having a frequency above about 17.9 kHz.

10. The system of claim 1, wherein the event is a motion picture.

11. The system of claim 10, wherein the operations cause the at least one consumer device to download an audio track for the motion picture, the audio track encoded with binaural audio information.

12. The system of claim 11, wherein the at least one consumer device comprises a mobile computing device.

13. The system of claim 1, wherein the synchronization information is received by at least one microphone of the at least one consumer device or associated device associated or coupled to the at least one consumer device.

14. The system of claim 1, further comprising enabling of the at least one consumer device to permit a user to provide feedback or ratings of the event that includes social media integration and/or coupling via an application programming interface to one or more of a Fandango, internet movie database ("IMDB") website, and a RottenTomatoes website.

15. The system of claim 1, further comprising enabling the at least one consumer device to support push notifications.

16. The system of claim 1, further comprising enabling the at least one consumer device to support coupon functionality where the user can be presented with offers for nearby restaurants or services.

17. The system of claim 1, further comprising enabling the at least one consumer device for one or more biofeedback and/or biomonitoring functions.

18. A system for delivery of binaural audio to consumer comprising:
a computing device comprising at least one processor;
a non-transitory computer readable medium, having stored thereon, instructions that when executed by the computing device, cause the computing device to perform operations wherein at least some of the operations occur within at least one consumer device, the operations comprising:
causing a delivery server to access or record at least a portion of a live or previously recorded audio file associated with an event, and processing or converting at least a portion of the audio file to least one binaural audio file;
enabling a delivery server to associate the at least one consumer device with the at least one binaural audio file associated with at least a portion of the event;
enabling the at least one consumer device to retrieve and download at least a portion of the at least one binaural audio file from the delivery server;
during the event, receiving at the at least one consumer device, at least one audio sync signal, the at least one audio sync signal associated with at least a portion of the event and the at least one binaural audio file; and
processing the at least one binaural audio file and delivering audio through an audio emitting device coupled to the at least one consumer device, wherein the delivered audio is synchronized with at least a portion of the event; and
wherein a position and rate of playback of processed audio data depends at least in part on a characteristic of the at least one consumer device.

19. The system of claim 18, wherein at least a portion of the at least one binaural audio file is delivered to the at least one consumer device during the event.

20. The system of claim 18, wherein the at least one binaural audio file is delivered to the at least one consumer device prior to the event.

21. The system of claim 18, wherein the audio sync signal emitted from loudspeakers of the event.

22. The system of claim 18, wherein the audio sync signal encodes a series of tones representing an audio offset value, the series of tones comprising different frequencies representing consecutive identical digits in the audio offset value.

23. The system of claim 22, further comprising re-synchronizing of the delivered audio while the event is in progress.

24. The system of claim 18, wherein the audio sync signal is received by at least one microphone of the at least one consumer device or associated device associated or coupled to the at least one consumer device.

25. The system of claim 18, further comprising enabling the at least one consumer device to integrate with social media and/or couple via an application programming interface to a web site to permit a user to provide feedback or ratings of the event.

26. The system of claim 18, further comprising enabling the at least one consumer device to support push notifications.

27. The system of claim 18, further comprising enabling the at least one consumer device for one or more biofeedback and/or biomonitoring functions.

* * * * *